(12) United States Patent
Chiu et al.

(10) Patent No.: US 7,798,013 B2
(45) Date of Patent: Sep. 21, 2010

(54) AUTOMATIC KEYBOARD INSPECTION APPARATUS

(75) Inventors: Shih-Wen Chiu, Taipei County (TW); Wen-Yu Tsai, Changhua County (TW); Lei-Lung Tsai, Taipei County (TW)

(73) Assignee: Darfon Electronics Corp., Taoyuan (TW)

( * ) Notice: Subject to any disclaimer, the term of this patent is extended or adjusted under 35 U.S.C. 154(b) by 359 days.

(21) Appl. No.: 12/107,156

(22) Filed: Apr. 22, 2008

(65) Prior Publication Data

US 2008/0257058 A1 Oct. 23, 2008

(30) Foreign Application Priority Data

Apr. 23, 2007 (TW) .............................. 96206473 U

(51) Int. Cl.
*G01N 3/08* (2006.01)

(52) U.S. Cl. ........................................................ 73/818
(58) Field of Classification Search .................... 73/818
See application file for complete search history.

(56) References Cited

U.S. PATENT DOCUMENTS

2009/0187684 A1* 7/2009 Han et al. ...................... 710/67

FOREIGN PATENT DOCUMENTS

TW 519244 1/2003

* cited by examiner

*Primary Examiner*—Lisa M Caputo
*Assistant Examiner*—Octavia Davis
(74) *Attorney, Agent, or Firm*—WPAT., P.C.; Justin King

(57) ABSTRACT

An automatic keyboard inspection apparatus, adapted for inspecting a keyboard, is disclosed, which comprises: a retractable device, a pressing part, a path control unit and a dual-axial platform; wherein, as the automatic keyboard inspection apparatus is enabled to operate in a first mode, the retractable device will activate a linkage rod to move axially so as to trigger the pressing part to drop by the gravity and thus press upon a specific key of the keyboard; and as the automatic keyboard inspection apparatus is enabled to operate in a second mode, specifying a route of a specific traveling distance, the pressing part is direct to travel and fall following the specified route to press upon the specific key; and the dual-axial platform, being adapted for carrying the keyboard, is able to perform a bi-axial movement with respect to a 2-D Cartesian coordinates of X, Y axes so as to enable the pressing part to drop and press on four different corners of the specific key for testing the same. With the aforesaid automatic keyboard inspection apparatus, the yield of keyboards can be increase.

12 Claims, 3 Drawing Sheets

AUTOMATIC KEYBOARD INSPECTION APPARATUS

FIELD OF THE INVENTION

The present invention relates to an automatic keyboard inspection apparatus, and more particularly, to an automatic keyboard inspection apparatus configured with a plurality of inspection modes for pressing and thus testing a keyboard in various patterns.

BACKGROUND OF THE INVENTION

In nowadays information society, most electronics information products such as computers, cellular phones or personal digital assistants (PDAs) usually come with a keyboard to be used as data input device for inputting commands or information. Accordingly, a keyboard that is not function normally is going to affect the correctness of electric signals being inputted into the electronics information product corresponding thereto and thus may cause abnormality to the electronics information product. Therefore, it is an important quality control item for performing an inspection procedure upon keyboards for determining whether or not all the keys on the keyboard are function normally.

Most keyboard inspection procedures used in the industry are performed either manually by man-power or automatically by machine. The manual inspection requires the hiring of a great amount of labors just for pressing each and every keys in keyboards to be tested by hand, that not only can achieve a very low inspection efficiency at a very high labor cost, but also erroneous inspection result may be caused since it can not ensure different keys to be pressed by the same pressing force and also it can not ensure the pressing force to be distributed evenly on the key when it is pressed. In addition, as different pressing forces should be used for testing different types of keyboards such as the thin-film capacitor type keyboard, such variation in pressing forces according to the type of keyboard to be tested as well as the variation in the duration of the pressing are all going to enhance the chance of erroneous judgment and thus raise the difficulty in quality control.

On the other hand, the automatic inspection apparatus as the one disclosed in TW. Pat. No. 519244, is powered by a pneumatic mean for exerting the pressing force upon each and every key on a tested keyboard as well as for indication lighting test. Such automatic inspection apparatus comprises: a integrated device including a pair of holding parts and at least an orientation part, used for holding a keyboard at a specific position for testing; a mode inspection module including a pressing inspection unit, a knob rotating unit and a lighting inspection unit, being disposed at positions corresponding to the keys and lightings on the tested keyboard; wherein the pressing inspection unit is configured with a retractable element in a manner that retractable element is connected to a pneumatic source so as to use the air ejected from the same for forcing the retractable element to extend and thus press upon a key of the keyboard. It is noted that the aforesaid pressing inspection unit can be brought to move by a displacement mechanism so that the pressing inspection unit can be moved to different positions for enabling the same to press upon each and every keys of the keyboard successively. Moreover, the result of each pressing of the pressing inspection unit, i.e. a pressing signal, is sent to an evaluation device via a signal linkage device for analysis and evaluation.

SUMMARY OF THE INVENTION

The object of the present invention is to provide a highly efficient, labor-saving automatic keyboard inspection apparatus, capable of using a retractable device to trigger a pressing part to drop by the gravity and thus press upon a specific key of the keyboard so as to test whether or not the specific key is able to function normally.

To achieve the above object, the present invention provides an automatic keyboard inspection apparatus, comprising: a retractable device, and a pressing part; wherein, the retractable device is movably connected to the pressing part by a linkage rod in a manner that when the retractable device is activated to extend axially, the pressing part is triggered to drop by the gravity and thus press upon a specific key of the keyboard, and thereby the specific key is tested.

Another object of the invention is to provide a highly efficient, labor-saving automatic keyboard inspection apparatus, capable of using a path control unit to control the traveling of a pressing part whereas the traveling is triggered by an retractable device, in that the traveling of the pressing part is designed to hit a specific key of a keyboard and thus the pressed key is tested for determining whether it is function normally.

To achieve the above object, the present invention provides an automatic keyboard inspection apparatus, comprising: a retractable device, a pressing part, a path control unit; wherein, the retractable device is fixedly connected to the pressing part by a linkage rod in a manner that when the retractable device is activated to extend axially, the pressing part is triggered to moved with the extension while being guided and defined by the path control unit and thus press upon a specific key of the keyboard, and thereby the specific key is tested.

Yet another object of the invention is to provide an automatic keyboard inspection apparatus, comprising a dual-axial platform, being disposed at a position under a pressing part while being adapted for carrying a keyboard, capable of performing a bi-axial movement with respect to a 2-D Cartesian coordinates of X, Y axes so as to enable the pressing part to press on four different corners of the specific key for testing the same.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
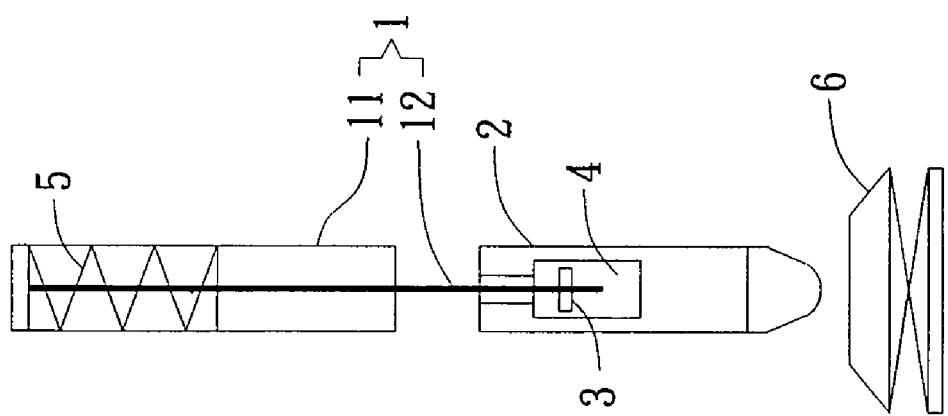
FIG. 1 is a sectional view of an automatic keyboard inspection apparatus being enabled to operate in a first mode according to an exemplary embodiment of the invention.

Please refer to FIG. 1, which is a sectional view of an automatic keyboard inspection apparatus being enabled to operate in a first mode according to an exemplary embodiment of the invention. The automatic keyboard inspection apparatus of FIG. 1 includes a retractable device 1, in which the retractable device 11 is configured with an axial extending part 11, being axially connected to a linkage rod of a specific length. It is noted that the axial extending part 11 can be driven by various driving devices, such as a solenoid valve, a pneumatic device, a motor, etc. By the driving of a driving device, the spring 5 of the axial extending part 11 is compressed or released so as to bring along the linkage rod 12 to move accordingly. In FIG. 1, the linkage rod 12 have a transverse-disposed short bar 3 attached thereto. The automatic keyboard inspection apparatus of FIG. 1 further has a pressing part 2, which is substantially an axial-disposed bar-like part having a tapered blunt nose attached to a bottom end thereof and is arranged underneath the retractable device 1. It is noted that the bar-like pressing part 2 can be an axial-disposed square rod or an axial-disposed round rod. In FIG. 1, the pressing part 2 is formed with an accommodation space therein, i.e. a square chamber as shown in FIG. 1, and having a hole formed by axially bored from a top end of the pressing part 2 to the accommodation space; and the diameter of the hole is larger than the diameter of the linkage rod 12 but smaller than the length of the transverse-disposed short bar 3; and the linkage rod 12 is disposed extendedly into the accommodation space via the hole for enabling the transverse-disposed short bar 3 to be received in the accommodation space in a manner that the pressing part 2 is propped by the transverse-disposed short bar 3 as the transverse-disposed short bar can be driven to abut against the inner top end of the square chamber. When the axial extending part 11 is driven to extend, the linkage rod 12 will be pushed to move and thus brought along the transverse-disposed short bar 3 to move downwardly in a manner that it is detached from the pressing part 2 for triggering the pressing part 2 to drop by the gravity. Thereafter, the dropping pressing part 2 will hit on a specific key 6 so that the specific key 6 is tested for determining whether or not the specific key 6 is able to function normally. On the other hand, when the axial extending part 11 is retracted, the transverse-disposed short bar 3 will be moved to abut against the inner top end of the square chamber while carrying the pressing part 2 to move upwardly so that the pressing part 2 is recovered back to its original position so that the pressing part 2 is prepared for the next test.

Figure 2:
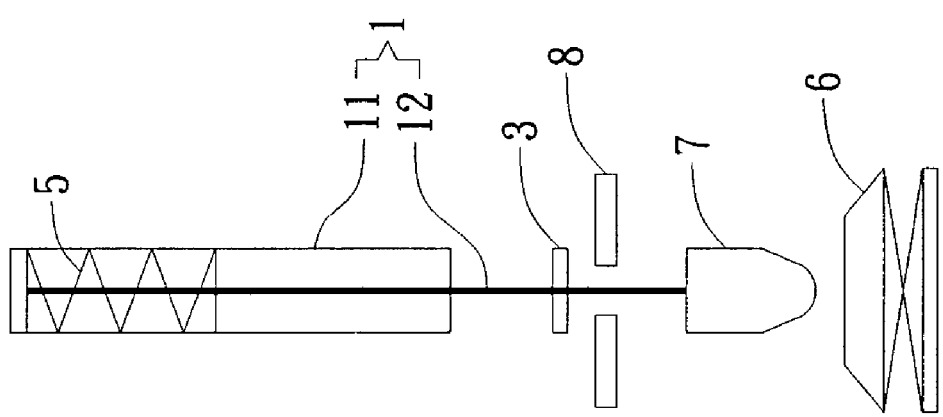
FIG. 2 is a schematic view of an automatic keyboard inspection apparatus being enabled to operate in a second mode according to an exemplary embodiment of the invention.

Please refer to FIG. 2, which is a schematic view of an automatic keyboard inspection apparatus being enabled to operate in a second mode according to an exemplary embodiment of the invention. The automatic keyboard inspection apparatus of FIG. 2 includes a retractable device 1, in which the retractable device 11 is configured with an axial extending part 11, being axially connected to a linkage rod of a specific length. It is noted that the axial extending part 11 can be driven by various driving devices, such as a solenoid valve, a pneumatic device, a motor, etc. By the driving of a driving device, the spring 5 of the axial extending part 11 is compressed or released so as to bring along the linkage rod 12 to move accordingly. In FIG. 2, the linkage rod 12 have a transverse-disposed short bar 3 attached thereto. The automatic keyboard inspection apparatus of FIG. 1 further has a pressing part 7, which is substantially an axial-disposed bar-like part having a tapered blunt nose attached to a bottom end thereof and is arranged underneath the retractable device 1. It is noted that the bar-like pressing part 7 can be an axial-disposed square rod or an axial-disposed round rod. In FIG. 2, the pressing part 7 is disposed in a manner that the pressing part 7 is connected to the linkage rod 12 by an end thereof other than that connecting to the axial extending part 11 of the retractable device 1. In addition, the automatic keyboard inspection apparatus of FIG. 2 has a path control unit 8, being disposed at a position between the axial extending part 11 and the pressing part 7, which is a plate-like part configured with a hole whose diameter is larger than that of the linkage rod 12 but smaller than the length of the traverse-disposed short bar 3. Moreover, the hole is formed boring through the plate-like path control unit 8 and is used for receiving the linkage rod 12 in a manner that the traverse-disposed short bar 3 is arranged on top of the hole and is spaced from the same by a specific traveling distance away. When the axial extending part 11 is driven to extend, the linkage rod 12 will be pushed to move and thus brought along the transverse-disposed short bar 3 to move downwardly until it is blocked and stopped by the path control unit 8, and thereby, the path control unit 8 is pushed to press upon a specific key 6 for testing whether or not the same is able to function normally.

Figure 3:
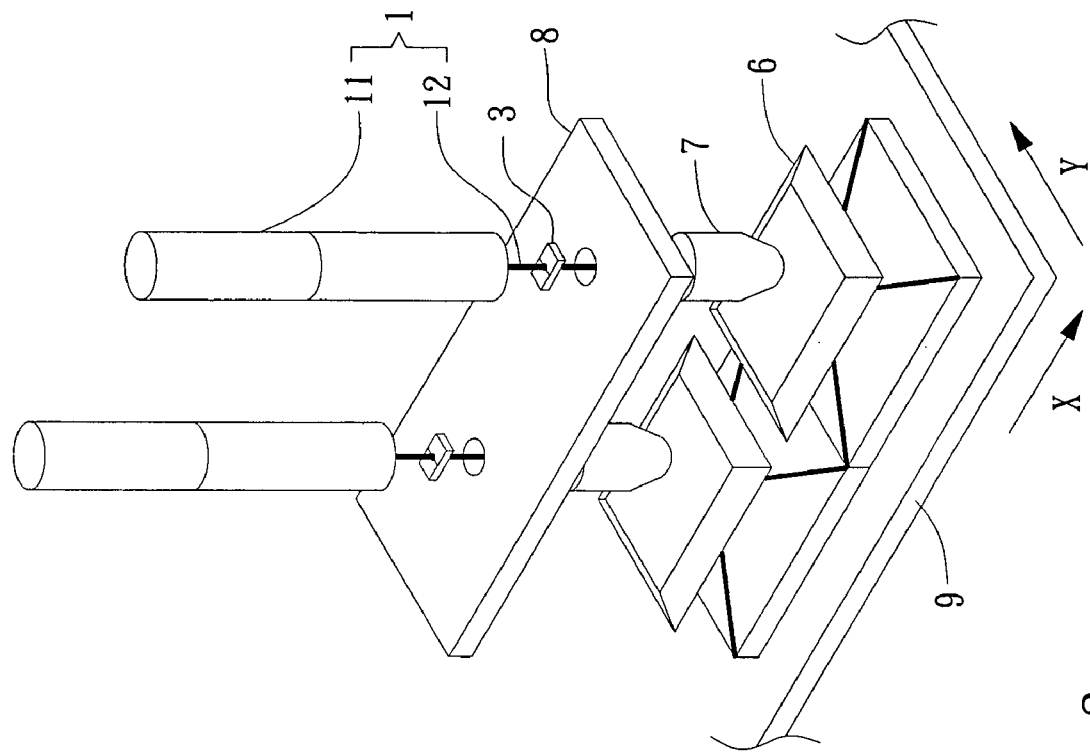
FIG. 3 is a three-dimensional diagram showing an automatic keyboard inspection system of the invention.
Figure 3:
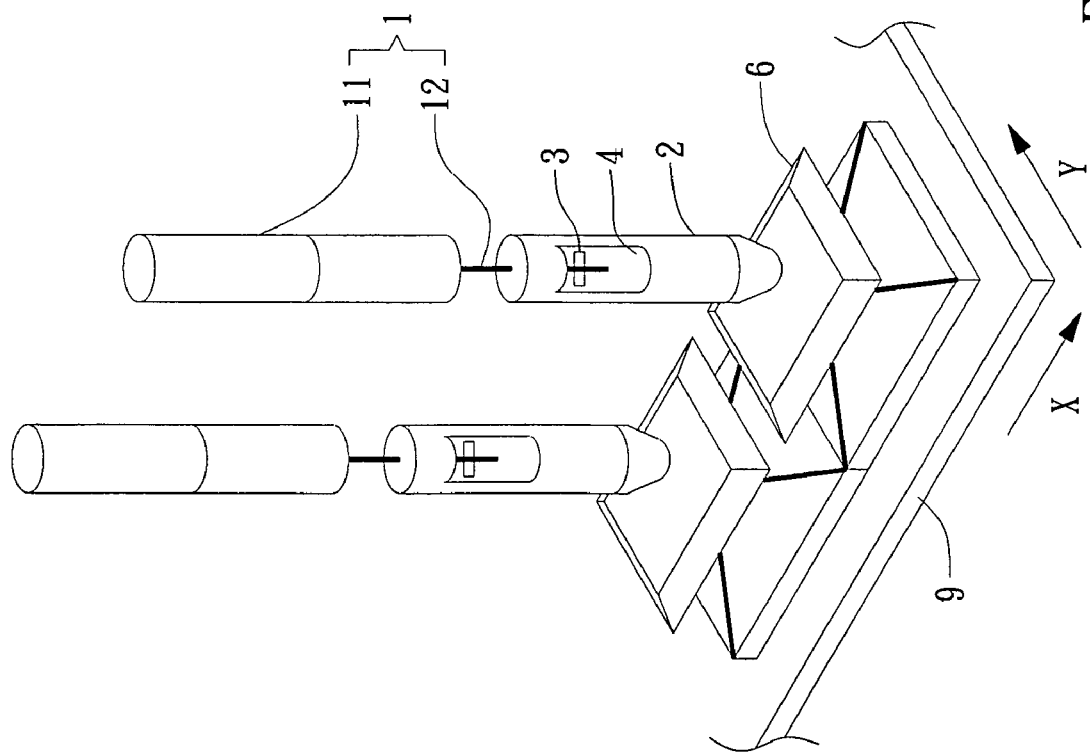

Please refer to FIG. 3, which is a three-dimensional diagram showing an automatic keyboard inspection system of the invention. The automatic keyboard inspection system comprises a plurality of automatic keyboard inspection apparatuses, as those shown in FIG. 2 and FIG. 2, and a dual-axial platform 9. The a dual-axial platform 9 is disposed at a position corresponding to the plural automatic keyboard inspection apparatuses, i.e. under the pressing part 2, while being adapted for carrying a keyboard, and is capable of performing a bi-axial movement with respect to a 2-D Cartesian coordinates of X, Y axes so as to enable the pressing part to press on four different corners of the specific key for testing the same.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic keyboard inspection apparatus, comprising:
a retractable device, further comprising:
an axial extending part, capable of extending axially; and
a linkage rod of a fixed length, axially connected to the axial extending part by an end thereof while having a traverse-disposed short bar attached thereto;
and
a pressing part, being an axial-disposed bar-like part having a tapered blunt nose attached to a bottom end thereof;
wherein, the pressing part is formed with an accommodation space therein and having a hole formed by axially bored from a top end of the pressing part to the accommodation space; and the diameter of the hole is larger than the diameter of the linkage rod but smaller than the length of the transverse-disposed short bar; and the linkage rod is disposed extendedly into the accommodation space via the hole for enabling the transverse-disposed short bar to be received in the accommodation space in a manner that the pressing part is propped by the transverse-disposed short bar.

2. The automatic keyboard inspection apparatus of claim 1, wherein the axial extending part is a device selected from the group consisting of: a solenoid valve, a pneumatic device, a motor and other driving devices.

3. The automatic keyboard inspection apparatus of claim 1, wherein the pressing part is a part selected from the group consisting of: an axial-disposed square rod and an axial-disposed round rod.

4. An automatic keyboard inspection apparatus, comprising:
   a retractable device, further comprising:
      an axial extending part, capable of extending axially; and
      a linkage rod of a fixed length, axially connected to the axial extending part by an end thereof while having a traverse-disposed short bar attached thereto;
   a pressing part, being an axial-disposed bar-like part having a tapered blunt nose attached to a bottom end thereof, being disposed in a manner that the pressing part is connected to the linkage rod by an end thereof other than that connecting to the axial extending part of the retractable device; and
   a path control unit, being a plate-like part configured with a hole whose diameter is larger than that of the linkage rod but smaller than the length of the traverse-disposed short bar;
   wherein, the hole is formed boring through the plate-like path control unit and is used for receiving the linkage rod in a manner that the traverse-disposed short bar is arranged on top of the hole and is spaced from the same by a specific traveling distance away.

5. The automatic keyboard inspection apparatus of claim 4, wherein the axial extending part is a device selected from the group consisting of: a solenoid valve, a pneumatic device, a motor and other driving devices.

6. The automatic keyboard inspection apparatus of claim 4, wherein the pressing part is a part selected from the group consisting of: an axial-disposed square rod and an axial-disposed round rod.

7. An automatic keyboard inspection system, comprising:
   a plurality of automatic keyboard inspection apparatuses, each further comprising:
      a retractable device, further comprising:
         an axial extending part, capable of extending axially; and
         a linkage rod of a fixed length, axially connected to the axial extending part by an end thereof while having a traverse-disposed short bar attached thereto;
      and
      a pressing part, being an axial-disposed bar-like part having a tapered blunt nose attached to a bottom end thereof;
   a dual-axial platform, being arranged at a position corresponding to the plural automatic keyboard inspection apparatuses and capable of performing a bi-axial movement with respect to a 2-D Cartesian coordinates of X, Y axes;
      wherein, the pressing part is formed with an accommodation space therein and having a hole formed by axially bored from a top end of the pressing part to the accommodation space; and the diameter of the hole is larger than the diameter of the linkage rod but smaller than the length of the transverse-disposed short bar; and the linkage rod is disposed extendedly into the accommodation space via the hole for enabling the transverse-disposed short bar to be received in the accommodation space in a manner that the pressing part is propped by the transverse-disposed short bar.

8. The automatic keyboard inspection apparatus of claim 7, wherein the axial extending part is a device selected from the group consisting of: a solenoid valve, a pneumatic device, a motor and other driving devices.

9. The automatic keyboard inspection apparatus of claim 7, wherein the pressing part is a part selected from the group consisting of: an axial-disposed square rod and an axial-disposed round rod.

10. An automatic keyboard inspection system, comprising:
    a plurality of automatic keyboard inspection apparatuses, each further comprising:
       a retractable device, further comprising:
          an axial extending part, capable of extending axially; and
          a linkage rod of a fixed length, axially connected to the axial extending part by an end thereof while having a traverse-disposed short bar attached thereto;
       and
       a pressing part, being an axial-disposed bar-like part having a tapered blunt nose attached to a bottom end thereof, being disposed in a manner that the pressing part is connected to the linkage rod by an end thereof other than that connecting to the axial extending part of the retractable device; and
    a dual-axial platform, being arranged at a position corresponding to the plural automatic keyboard inspection apparatuses and capable of performing a bi-axial movement with respect to a 2-D Cartesian coordinates of X, Y axes;
       wherein, the hole is formed boring through the plate-like path control unit and is used for receiving the linkage rod in a manner that the traverse-disposed short bar is arranged on top of the hole and is spaced from the same by a specific traveling distance away.

11. The automatic keyboard inspection apparatus of claim 10, wherein the axial extending part is a device selected from the group consisting of: a solenoid valve, a pneumatic device, a motor and other driving devices.

12. The automatic keyboard inspection apparatus of claim 10, wherein the pressing part is a part selected from the group consisting of: an axial-disposed square rod and an axial-disposed round rod.

* * * * *